(12) United States Patent
Huber et al.

(10) Patent No.: US 8,356,853 B2
(45) Date of Patent: Jan. 22, 2013

(54) METHOD AND COUPLING DEVICE FOR STOWING A MOTOR VEHICLE SEAT

(75) Inventors: Kirsten Huber, Mainz (DE); Jürgen Maier, Weitersweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/942,925

(22) Filed: Nov. 9, 2010

(65) Prior Publication Data

US 2011/0133505 A1 Jun. 9, 2011

(30) Foreign Application Priority Data

Nov. 10, 2009 (DE) .......................... 10 2009 052 594

(51) Int. Cl.
*B60N 3/12* (2006.01)

(52) U.S. Cl. ................. 296/37.8; 296/37.14; 296/37.15; 296/37.16

(58) Field of Classification Search ............... 296/181.7, 296/37.5, 37.8, 37.14, 37.15, 37.16, 66, 69
See application file for complete search history.

(56) References Cited

U.S. PATENT DOCUMENTS

| | | | | |
|---|---|---|---|---|
| 1,179,445 A | * | 4/1916 | Manning | 296/37.5 |
| 3,632,029 A | * | 1/1972 | Sonner | 224/275 |
| 5,299,704 A | * | 4/1994 | Thorby | 220/6 |
| 5,795,005 A | * | 8/1998 | Garfias et al. | 296/37.5 |
| 5,829,655 A | | 11/1998 | Salopek | |
| 6,026,646 A | * | 2/2000 | Hansen et al. | 62/3.6 |
| 6,053,553 A | * | 4/2000 | Hespelt | 296/37.1 |
| 6,135,332 A | * | 10/2000 | Eleam | 224/275 |
| 6,253,943 B1 | | 7/2001 | Spykerman et al. | |
| 6,401,995 B1 | * | 6/2002 | Yuille et al. | 224/404 |
| 6,550,654 B1 | * | 4/2003 | Crago | 224/275 |
| 6,676,184 B2 | | 1/2004 | Gehring et al. | |
| 6,698,829 B1 | * | 3/2004 | Freijy et al. | 297/188.09 |
| 6,832,799 B2 | * | 12/2004 | Haspel et al. | 296/37.16 |
| 6,837,531 B2 | * | 1/2005 | Mack et al. | 296/65.09 |
| 6,942,270 B1 | * | 9/2005 | Mulvihill | 296/37.16 |
| 7,121,601 B2 | * | 10/2006 | Mulvihill et al. | 296/24.33 |
| 7,350,681 B2 | * | 4/2008 | Polburn et al. | 224/275 |

(Continued)

FOREIGN PATENT DOCUMENTS

DE 3729837 A1 3/1989

(Continued)

OTHER PUBLICATIONS

German Patent Office, German Search Report for Application No. 102009052594.7, dated Feb. 26, 2010.

*Primary Examiner* — Jason S Morrow
(74) *Attorney, Agent, or Firm* — Ingrassia Fisher & Lorenz, P.C.

(57) ABSTRACT

A storage compartment is provided for a motor vehicle that includes, but is not limited to a motor vehicle seat. The storage compartment further includes, but is not limited to a movable element, a cargo space in the motor vehicle defined with the movable element that is at least partially bordered by the motor vehicle seat and situated with respect to the motor vehicle seat, and a wall bordering the cargo space in at least one direction and detachably coupled with the movable element with a coupling element so that the wall moves with the movable element.

18 Claims, 2 Drawing Sheets

U.S. PATENT DOCUMENTS

| | | | |
|---|---|---|---|
| 7,628,438 B2 * | 12/2009 | Partch | 296/24.46 |
| 7,762,601 B2 * | 7/2010 | Shea et al. | 296/37.16 |
| 7,806,453 B2 * | 10/2010 | Aebker | 296/37.16 |
| 2005/0279793 A1 * | 12/2005 | Mulvihill | 224/542 |
| 2008/0169668 A1 | 7/2008 | Muramatsu | |
| 2008/0197653 A1 | 8/2008 | Lawall et al. | |
| 2011/0095571 A1 * | 4/2011 | Maguire et al. | 296/193.07 |

FOREIGN PATENT DOCUMENTS

| | | |
|---|---|---|
| DE | 19807319 A1 | 8/1999 |
| DE | 19838734 A1 | 3/2000 |
| DE | 10108337 A1 | 8/2002 |
| DE | 102004024621 A1 | 12/2004 |
| JP | 62194948 A | 8/1987 |

* cited by examiner

METHOD AND COUPLING DEVICE FOR STOWING A MOTOR VEHICLE SEAT

CROSS-REFERENCE TO RELATED APPLICATION

This application claims priority to German Patent Application No. 102009052594.7, filed Nov. 10, 2009, which is incorporated herein by reference in its entirety.

TECHNICAL FIELD

The technical field relates to a method for providing a bordered storage compartment in a bordered cargo space with at least one variable cargo space boundary, in particular in a motor vehicle with a cargo space that can be varied by means of at least one adjustable motor vehicle seat and is situated behind and/or under the motor vehicle seat. The technical field further relates to a storage compartment for a cargo space with at least one cargo area boundary in a motor vehicle that is defined and/or variable by means of a movable element, in particular for a cargo space that is at least partially bordered by a motor vehicle seat and situated behind and/or under a motor vehicle seat. The technical field also relates to a storage device for a motor vehicle, in particular in a floor area behind and/or under a motor vehicle seat and a motor vehicle, in particular to a motor vehicle with at least one seat that can be collapsed in a cargo space.

BACKGROUND

Known from prior art are various motor vehicle rear seats, which can be stowed in a corresponding cargo space by folding over the seat backrest and/or seat cushion in order to economize on space. For example, known from JP 621 94 948A, US 2008/0197653 A1 and DE 10 2004 024 621 A1 are storable motor vehicle seats, which have a folding mechanism between the backrest upholstery and seat bench upholstery. The folding mechanism has swivel joints to fold the seatback onto the seat cushion, and swivel the collapsed seat toward the front into a free space below. For example, DE 10 2004 024 621 A1 discloses a collapsible seat for a motor vehicle, which in its folded configuration can be lowered under the seat of a preceding row of seats. In the folded configuration, the backrest rests on the upper side of the seat section. Also generally known from prior art are cargo spaces that are provided in or on a vehicle structure.

In view of the foregoing, at least one object is to create a space concept for a motor vehicle that makes previously unused space usable for a user. At least another object is to provide a flexible cargo space that is adjusted to the respective configuration of the motor vehicle and easy to use. In addition, other objects, desirable features, and characteristics will become apparent from the subsequent summary and detailed description, and the appended claims, taken in conjunction with the accompanying drawings and this background.

SUMMARY

A method provides a bordered storage compartment in a bordered cargo space with at least one variable cargo space boundary, in particular in a motor vehicle with a cargo space that can be varied by means of at least one adjustable motor vehicle seat and is situated behind and/or under the motor vehicle seat, it is provided that at least one storage compartment wall of the storage compartment is variably coupled with at least one variable cargo space boundary, so that the storage compartment wall moves as the cargo space boundary changes. A cargo space provided for a seat or roof remains unused while using the roof, seat or the like. A suitable space concept makes it possible to use this space. The present cargo space is at least partially bordered by a movable element, for example by the seat. If a user modifies or adjusts the seat, the cargo space or corresponding cargo space boundary changes accordingly. By generating a storage compartment in the cargo space whose storage compartment wall is coupled with the variable cargo space boundary, for example the seat, the storage compartment wall also moves given a corresponding coupling with the cargo space boundary. The storage compartment is adjusted to the respective constellation in this way. Stops or other limiters limit movement by the storage compartment. For example, a storage compartment is in this way moved between a minimal position, for example a collapsed position for a folding or collapsible storage compartment, and a maximal position, for example a deployed position. The coupling is detachable in this configuration. The storage compartment is preferably also detachable in design. If needed, the storage compartment is removed from the cargo space or coupled with the cargo space.

A storage compartment is provided for a cargo space with at least one cargo space boundary in a motor vehicle defined and/or variable by means of a movable element, in particular for a cargo space that is at least partially bordered by a motor vehicle seat and situated behind and/or under a motor vehicle seat, it is provided that a wall bordering the cargo space in at least one direction is detachably coupled with the movable element via coupling elements, so that the storage compartment wall can move with the movable element. For example, the movable element is an adjustable, in particular traversable and/or collapsible seat, a folding roof and the like. Changing the element, for example through movement, collapsing or some other modification, a cargo space boundary at least partially defined by the corresponding element can be changed. A storage compartment is formed in the cargo space. The storage compartment is defined by walls. The walls are at least partially variable, so that the storage compartment can be varied at least in terms of its size. For example, the walls can be folded, collapsed, elastically deformed or the like. In order to adjust the storage compartment to the respective cargo space constellation, at least one wall is coupled with a cargo space boundary, for example a seat. Coupling takes place in such a way that, as the cargo area becomes smaller, so too does the storage compartment. The same holds true for enlarging the cargo space. Accordingly, at least one storage compartment boundary moves in conjunction with the cargo space boundary.

One embodiment provides that several variable storage compartment walls are provided, and coupled together to yield a foldable storage compartment box. Coupling several variable storage compartment walls permits an optimized use of the cargo space. The more flexibly the walls are coupled, the better the adjustment. For example, configuration as a collapsible or foldable storage compartment box makes it possible to collapse the storage compartment, so that the latter takes up only a minimal storage volume, if any. Accordingly, the storage compartment box can be spread out to occupy a maximum volume when the maximal cargo space is available. For example, the wall is coupled by means of swivel joints, guiding grooves and the like.

Another embodiment provides that the coupling elements encompass connecting elements arranged on at least one storage compartment wall for purposes of attachment to at least one of the variable cargo space boundaries. In a preferred embodiment, the connecting elements are designed as quickly detachable connecting elements, which can be quickly and detachably connected with at least one of the cargo space boundaries. In advantageous embodiments, the connecting elements are used as connecting elements that can be detached without tools. This enables an easy coupling and decoupling process. In addition, a quick and easy coupling can be established in the cargo space when removing or inserting the storage compartment. For example, the connecting elements encompass hooks, which can be latched into corresponding lugs. Other connecting elements encompass corresponding magnets, pushbuttons, clip connectors and the like.

A storage device is provided for a motor vehicle, in particular in a floor area behind and/or under the motor vehicle seat, with a cargo space at least partially bordered by a fixed vehicle structure and movable vehicle structure, so that the latter exhibits variable boundaries, it is provided that a storage compartment is arranged in the cargo space. The cargo space is bordered by a corresponding motor vehicle structure and/or corresponding elements. In one embodiment, the cargo space is partially bordered by a motor vehicle floor and a motor vehicle seat. The motor vehicle seat folded and/or collapsed to allow stowage in the cargo space. Changing the seat alters the cargo space boundaries. Arranging the collapsed seat in the cargo space diminishes the size of the cargo space accordingly. A storage compartment coupled with the seat and placed in the cargo space is also diminished in size accordingly. If the cargo space available for a storage compartment to be incorporated is too small, the storage compartment is designed to be removable, for example.

Therefore, one embodiment provides that at least one of the movable storage compartment walls is connected with at least the movable vehicle structure. The connection is crash-proof, so that the storage compartment is reliably held even during an accident. Correspondingly, suitable connecting elements are provided, such as screws, hooks, clip connectors, pushbuttons or the like. In addition, a vehicle structure can have recesses or receptacles for the storage compartment, thereby ensuring additional support.

Another embodiment provides that the movable vehicle structure encompasses at least one collapsible motor vehicle seat that can be stowed at least partially in the cargo space. Additionally or alternatively, the movable vehicle structure is designed as a retractable roof.

Yet another embodiment provides that the fixed motor vehicle structure encompasses a floor area of the motor vehicle, in particular a floor area behind and/or under a motor vehicle seat in the area of a loading space. In particular, the motor vehicle structure is designed as a floor area around a third row of seats. Removing the third row of seats opens a large cargo space for the storage compartment. If the third row of seats is installed, the available cargo space is bordered by the row of seats. A storage compartment is coupled with the seat in the constellation. When the seat is folded in or collapsed, and the seat is stowed, the coupling triggers an adjustment of the storage compartment wall. The storage compartment is adjusted to the available cargo space accordingly.

A motor vehicle is provided, in particular a motor vehicle with at least one collapsible seat that can be at least partially stowed in a cargo space, it is provided that at least one storage device according to the invention is on hand. In particular in cabriolets, vans or minivans, this generates a flexible cargo space with a corresponding storage compartment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
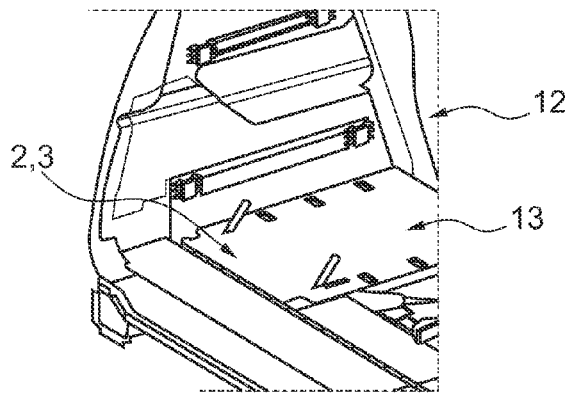
FIG. 1 is a diagrammatic, perspective view of a cargo space in the area of a third row of seats, without the third row of seats.
Figure 2:
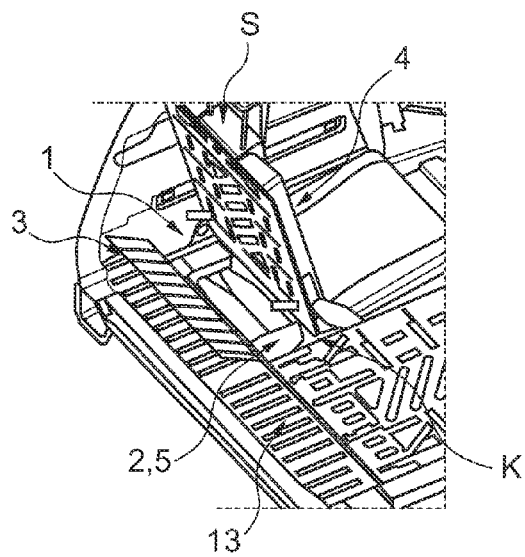
FIG. 2 is a diagrammatic, perspective view of the cargo space according to FIG. 1, with the seat and storage compartment incorporated.
Figure 3:
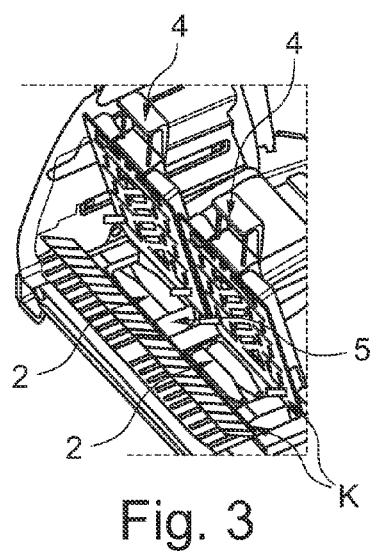
FIG. 3 is a diagrammatic, perspective view of the cargo space according to FIG. 1, with two seats and two storage compartments incorporated one next to the other.
Figure 4:
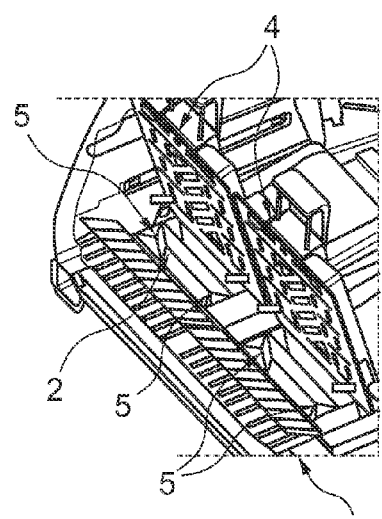
FIG. 4 is a diagrammatic, perspective view of the depiction on FIG. 3, with empty, partially collapsed storage compartments.

FIG. 1 to FIG. 7 show various constellations of a cargo space 1 of a motor vehicle, in particular of a storage compartment 2. FIG. 1 to FIG. 6 show a motor vehicle tail of a vehicle (not shown in any greater detail). For example, the motor vehicle has one, two or three rows of seats (not shown). The depicted rear loading space 12 is provided behind the rows of seats. If necessary, an additional row of seats S, in particular a third row of seats as depicted on FIG. 2, can be provided in the depicted loading space 12, if needed. The loading space 12 is usually covered by a cover (not shown), for example a blind cover. The cargo space 1 not visible on FIG. 1 is arranged in a floor area 13 of the loading space 12 under a foldable lid 3. As evident from FIGS. 2 to 6, the storage compartment 2 is situated in the cargo space 1. The cargo space 1 is bordered in part by a lid 3 and in part by a motor vehicle structure K. Designated as the motor vehicle structure K here in conjunction with the invention are both fixed parts, such as a floor or wall of the vehicle, and movable parts, such as a seat. In the exemplary embodiment shown, the cargo space 1 is bordered by the motor vehicle floor and a seat 4 of the additional row of seats S.

Figure 5:
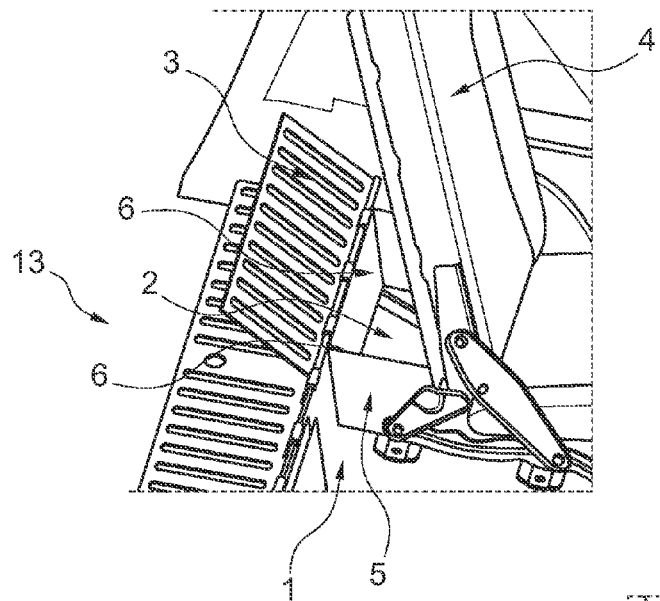
FIG. 5 is a different diagrammatic perspective view of the storage compartment.

Adjusting the movable part of the motor vehicle structure K, i.e., adjusting the seat 4 in the exemplary embodiment, makes it possible to vary the size of the cargo space 1 situated behind this seat 4. The size is also changed by folding up the seats 4, as depicted on FIG. 1 to FIG. 4. The storage compartment 2 is adjusted to the respective constellation. As depicted in particular on FIG. 4, the storage compartment 2 can be collapsed or folded together. To this end, the storage compartment wall 5 is articulated, so that it can be at least partially folded. The storage compartment 2 is secured to the floor area 13 via connecting elements 6. FIG. 5 shows a possible attachment by means of connecting elements 6 designed as pushbuttons or clips. The attachment can be detached without tools accordingly, making it possible to remove the storage compartment 2 from the cargo space 1. To allow the storage compartment 2 to move concurrently with the cargo space borders, the storage compartment 2 is coupled with the movable motor vehicle structure.

Figure 6:
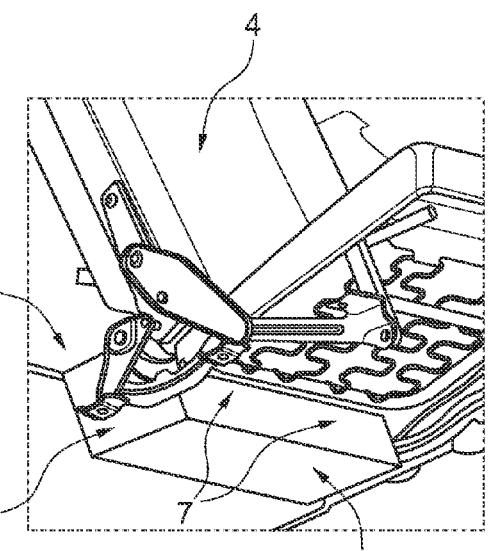
FIG. 6 is a different diagrammatic perspective view of the attachment of the storage compartment to the seat.

FIG. 6 shows an attachment of the storage compartment 2 to the seat 4 in detail. The attachment is established with connecting elements 7, which are designed as hooks (as depicted on FIG. 6), rubber bands or the like. These connecting elements 7 project from a wall, and can be secured to the seat 4 or other elements at the corresponding locations. The storage compartment 2 is suitably designed so that its dimensions can be varied, and the size can be adjusted to changed boundaries of the cargo space 1.

Figure 7:
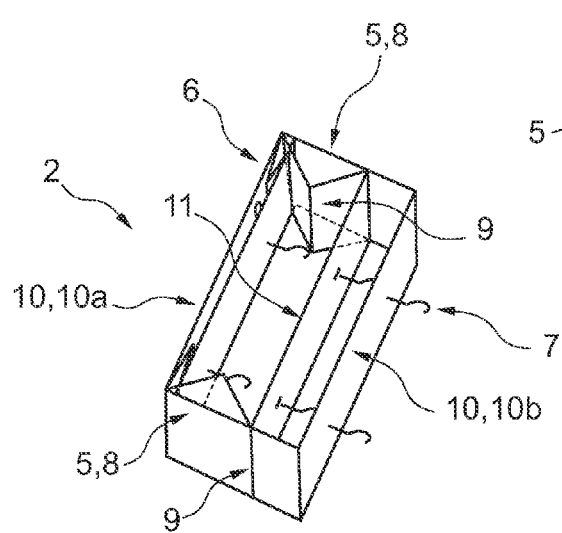
FIG. 7 is a diagrammatic, perspective view of the storage compartment without the motor vehicle structure.

FIG. 7 shows a possible embodiment. The storage compartment 2 encompasses two narrow side walls 8 and two longitudinal side walls 10, which are coupled to each other. The storage compartment 2 is secured to a first longitudinal side wall 10a via connecting elements 6 on a floor area 13 visible on FIG. 5, and to a second longitudinal side wall 10b via connecting elements 7 on the seat 4 also visible on FIG. 5.

In the embodiment shown, the two narrow side walls 8 have joints 9 that each foldably joins the corresponding parts of the narrow side wall 8 with each other. The joints 9 are designed as film hinges, for example. If the longitudinal side wall 10b is moved accordingly with the seat 4, the storage compartment 2 is collapsed (as diagrammatically depicted on FIG. 7). The storage compartment 2 adjusts to the cargo space boundaries. In addition to the two longitudinal side walls 8 and the two narrow side walls 8, the storage compartment 2 in the embodiment depicted here also exhibits a floor wall 11. The floor wall 11 is also designed to be telescoped or collapsed. The storage compartment 2 is open toward the top, thereby making a storage compartment interior accessible.

In a depicted exemplary embodiment, the motor vehicle that accommodates the storage compartment 2 is designed as a (mini)van, station wagon or another motor vehicle with a third row of seats S. When using the third row of seats S, i.e., when the latter is upright, the cargo space 1 used for the folded state of the seat 4 is coverer by a roll box blind in order to cover the loading space. Situated under the upright seat 4 is about a 160 mm×370 mm×135 mm volume that can be used as a cargo space 1, which corresponds to enough volume to hold about four 0.5 bottles, one roadmap, four digital cameras or one sports bags or a pair of shoes per vehicle side. This cargo space 1 can only be used with the seat 4 in a use position. If at least one of the seats is folded, the flexible configuration of the storage compartment 2 ensures that the storage compartment 2 is not folded out into the cargo space 1. The storage compartment, or even the storage box, is flexibly designed, and travels with the foldable seat. If the seat is folded, the storage compartment 2 collapses. In this way, the storage compartment 2 can be used regardless of the number of vehicle passengers, thereby offering additional stowage space, even though a luggage compartment volume of the loading space 12 is eliminated owing to the third row of seats S. The depicted storage compartment 2 designed as a folding box or storage box is clipped on the body side, meaning to the fixed motor vehicle structure K, and hooked in by the seat, so that the storage compartment 2 mimics each movement made by the seat 4. Folding the later together ensures that no objects are located under the seat 4, so as not to impair the kinematics of the seat 4 for the collapsing process. The storage compartment 2 is preferably made out of a lightweight building material.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A storage compartment for a motor vehicle comprising a motor vehicle seat, comprising:
    a movable element;
    a cargo space in the motor vehicle defined with the movable element that is at least partially bordered by the motor vehicle seat and situated with respect to the motor vehicle seat; and
    a reconfigurable wall bordering the cargo space in at least one direction and detachably coupled with the movable element with a coupling element so that the wall moves with the movable element.

2. The storage compartment according to claim 1, further comprising a plurality of variable storage compartment walls coupled with each other to yield a foldable storage compartment box.

3. The storage compartment according to claim 2, wherein the coupling element is adapted to encompass a plurality of connecting elements arranged on at least one of the plurality of variable storage compartment walls.

4. The storage compartment according to claim 3, wherein the plurality of connecting elements are adapted to detachably connect with at least one of a plurality of cargo space boundaries.

5. A storage device for a floor area of a motor vehicle seat, comprising:
    a cargo space having variable boundaries provided with at least partial borders by a fixed vehicle structure and a movable vehicle structure; and
    a storage compartment arranged in the cargo space, the storage compartment comprising:
        a movable element defining the cargo space that is at least partially bordered by the motor vehicle seat and situated with respect to the motor vehicle seat; and
        an articulated wall bordering the cargo space in at least one direction and detachably coupled with the movable element with a coupling element so that the articulated wall moves with the movable element.

6. The storage device according to claim 5, further comprising a plurality of variable storage compartment walls coupled with each other to yield a foldable storage compartment box.

7. The storage device according to claim 6, wherein the coupling element is adapted to encompass connecting elements arranged on at least one of the plurality of variable storage compartment walls.

8. The storage device according to claim 7, wherein the connecting elements is detachably connect with at least one of a plurality of cargo space boundaries.

9. The storage device according to claim 6, wherein at least one of the plurality of variable storage compartment walls is connected with at least the movable vehicle structure.

10. The storage device according to claim 9, wherein the movable vehicle structure is adapted to encompass at least one collapsible motor vehicle seat that can at least partially be stowed in the cargo space.

11. The storage device according to claim 5, wherein the movable vehicle structure is adapted to encompass the floor area of a motor vehicle in an area of a loading space.

12. A motor vehicle, comprising:
    a collapsible seat;

a storage device for a floor area of a motor vehicle seat, comprising:
a cargo space having variable boundaries provided with at least partial borders by a fixed vehicle structure and a movable vehicle structure; and
a storage compartment arranged in the cargo space, the storage compartment comprising:
a movable element defining the cargo space that is at least partially bordered by the collapsible seat and situated with respect to the collapsible seat; and
an articulated wall bordering the cargo space in at least one direction and detachably coupled with the movable element with a coupling element so that the articulated wall moves with the movable element.

13. The motor vehicle according to claim 12, further comprising a plurality of variable storage compartment walls coupled with each other to yield a foldable storage compartment box.

14. The motor vehicle according to claim 13, wherein the coupling element is adapted to encompass a plurality of connecting elements arranged on at least one of the plurality of variable storage compartment walls.

15. The motor vehicle according to claim 14, wherein the plurality of connecting elements are adapted to detachably connect with at least one of a plurality of cargo space boundaries.

16. The motor vehicle according to claim 13, wherein at least one of the plurality of variable storage compartment walls is connected with at least the fixed vehicle structure.

17. The motor vehicle according to claim 16, wherein the movable vehicle structure is adapted to encompass at least one collapsible motor vehicle seat that can at least partially be stowed in the cargo space.

18. The motor vehicle according to claim 16, wherein the fixed vehicle structure is adapted to encompass the floor area of the motor vehicle in an area of a loading space.

* * * * *